Patented July 21, 1931

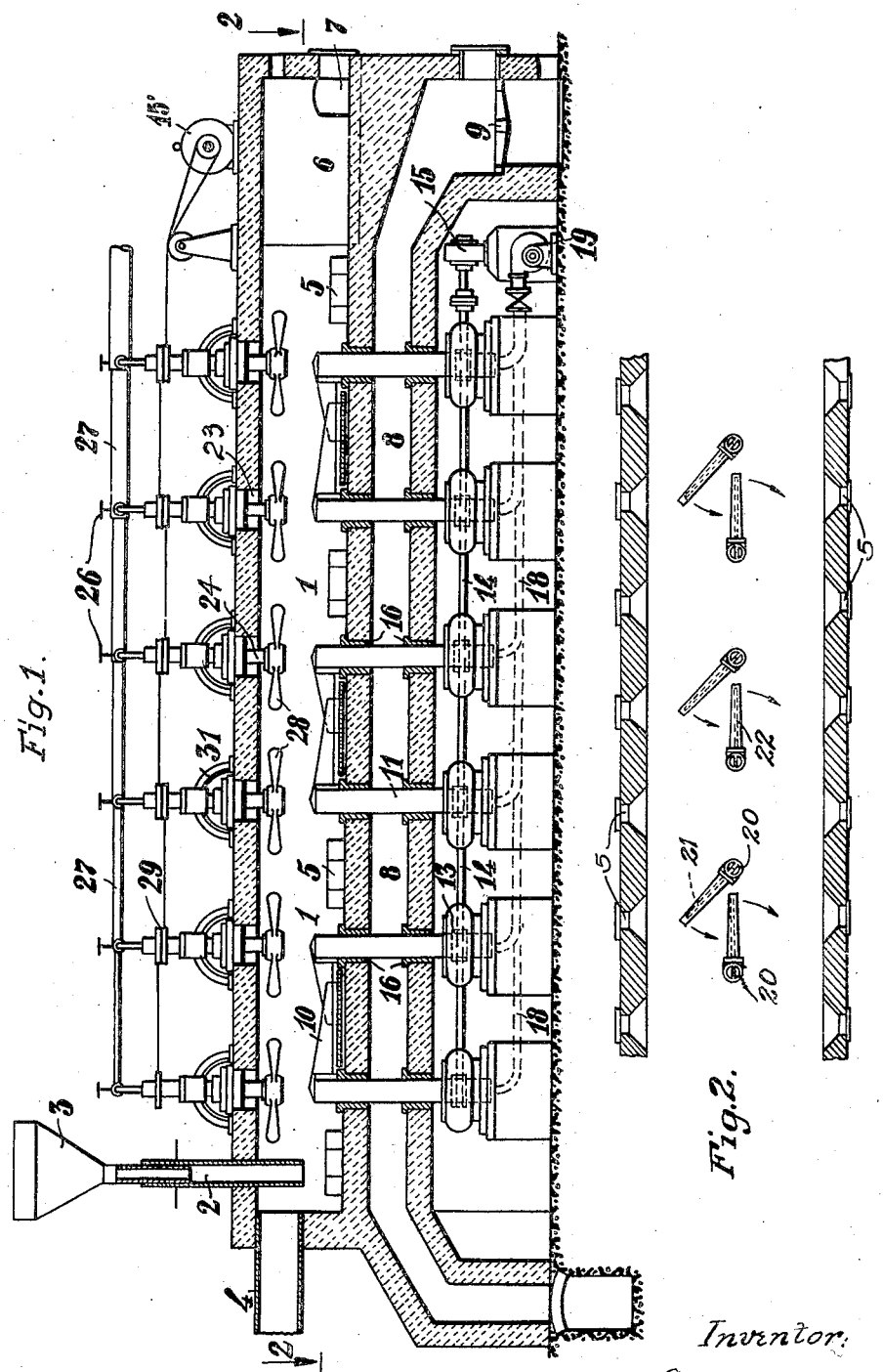

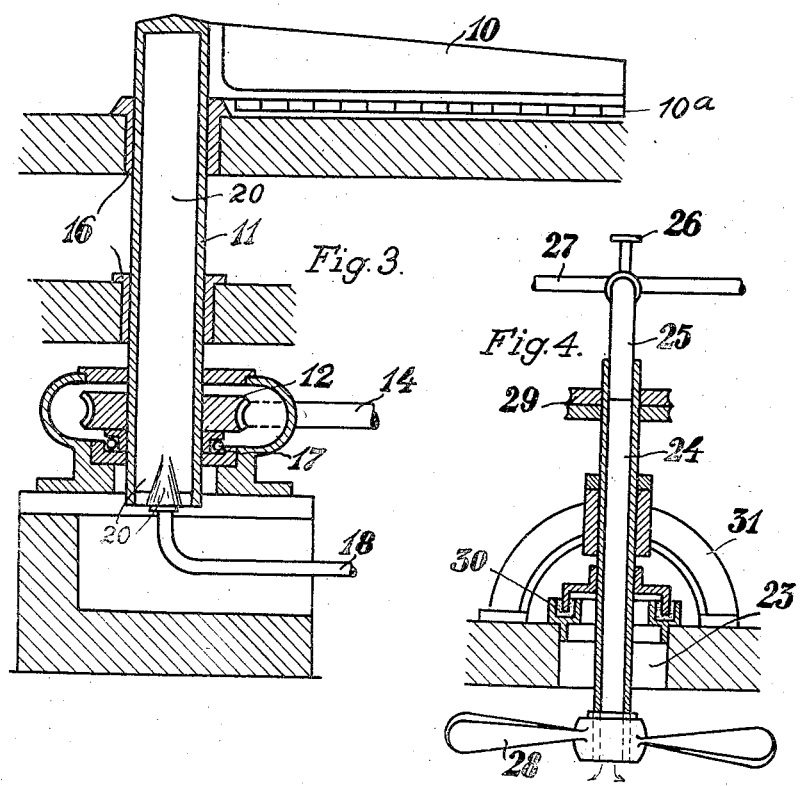

1,815,040

UNITED STATES PATENT OFFICE

GEORG BALZ, OF TÜBINGEN, GERMANY, ASSIGNOR TO BALZ-ERZRÖSTUNG GESELL-SCHAFT MIT BESCHRANKTER HAFTUNG, OF GLEIWITZ, GERMANY

METHOD OF AND MEANS FOR ROASTING ZINC BLENDE AND THE LIKE

Application filed October 25, 1928, Serial No. 315,059, and in Austria October 31, 1927.

This invention relates to the roasting of zinc-blende and other ores through the medium of muffle furnaces through which the ore is fed in one direction and air for the roasting in the opposite direction.

It is usually difficult to carry out the roasting process in a perfectly satisfactory manner. At the discharge end of the muffle a too rapid cooling of the materials subjected to the last stages of the roasting process is liable to occur owing to the contact with the admitted air, and further along the muffle dangerously high temperatures are likely to develop which might cause sintering and the formation of zinc ferrites. In the case of high roofed muffles, moreover, the air is inclined to sweep over the materials without coming into intimate contact with the same.

The object of the present invention is to carry out the roasting process in a manner which allows a perfect control of the same in all its stages and which brings about a rapid oxidation of the materials and a consequent shortening of the roasting process. This object is achieved according to the invention by setting up within the muffle downward currents of air adapted to penetrate into the moving ore layer. The means for setting up such currents preferably consist of fans arranged inside the muffle on vertical, revolving shafts. The shafts are made hollow so as to allow fresh air to be admitted through the shafts directly under the fans.

Fig. 1 of the accompanying drawings represents a vertical, longitudinal section of the furnace, Fig. 2, a horizontal section of the same on the line 2—2 of Fig. 1.

Fig. 3, a section on an enlarged scale of one of the propelling and agitating devices, and Fig. 4, a section on an enlarged scale of one of the fanning devices.

The furnace comprises a muffle 1 one end of which receives the materials from a hopper 3 and a vertical delivery pipe 2 which is adjustable so that the delivery orifice can be set more or less close to the sole of the muffle. While the materials are fed along the muffle in one direction towards a discharge aperture 7, air is drawn in near the discharge so as to pass in the opposite direction towards a gas outlet 4. A silo 6 wherein the materials are collected before they are discharged, is built over a fire chamber fitted with a grate 9. From said chamber a flue 8 is run underneath and parallel to the muffle so as to supply heat to the latter. The side walls of the muffle are fitted with inspection apertures 5.

For agitating the materials and at the same time feeding them slowly through the muffle, a plurality of vanes 10 are provided which are mounted on vertical shafts 11. The latter pass through the flue 8 and are held in snugly fitting bearing bushings 16 in the walls which confine the flue. Underneath the latter there are thrust bearings 17 whereon the shafts are supported, as shown in Fig. 3. To each shaft a worm wheel 12 is secured which meshes with a worm 13 secured to a common driving shaft 14. The latter is operated by a motor 15. Alternate shafts rotate in opposite directions, as indicated in Fig. 2, the gears being for this purpose alternately right and left hand. The vanes are fitted with propelling blades 10a which are set in an oblique position relative to the vanes, the direction of the obliquity being determined by the direction in which the vane moves.

In order to protect the shafts and vanes from being overheated, they are made hollow and divided by partitions 20 and 21 respectively (Fig. 2) into two ducts which communicate with each other at the tip of the vane. One of the ducts opens into the space below the shaft, while the other communicates with a pipe 18 through which air is forced by means of a blower 19. The air from the blower will thus pass up one of the ducts to the tip of the vane and return thence through the other duct to the discharge, and the shafts and vanes will be effectively cooled.

In order to allow the roasting process to be regulated according to requirements through the entire muffle, the latter is fitted with a row of fans 28 mounted on vertical shafts 24 which depend from the roof of the muffle. The shafts are admitted through apertures 23 in the roof and are supported by means of bearings on yokes 31 which rest on the roof. A flanged disc on each shaft dips into a sand well 30 (Fig. 4) immediately above the aperture 23 and forms a closure for the latter. Rotation may be imparted to the shafts through the medium of belt pulleys 29, each shaft being provided with two pulleys one of which is a driven pulley and the other a driving pulley whereby motion is transmitted to the next shaft. The first shaft receives its motion from a separate motor 15'. The belts are crossed so as to cause adjacent shafts to rotate in opposite directions. All the shafts are hollow and connected to a pipe 27 which supplies fresh air. The diameter of the pipe 27 is reduced after each shaft so that all the fans will operate under similar pressure conditions. The communication of the pipe 27 with each shaft 24 is controlled by means of a valve 26.

The materials are fed slowly through the muffle during the roasting process which can be watched through the apertures 5. So long as the valves 26 are closed, the fans 28 agitate the air passing through the muffle and maintain continous downward currents which penetrate the materials underneath. If in any part of the muffle signs of excessive heating should be observed, the valves 26 above this part are opened so as to admit fresh, cold air through the respective shafts 24. The air will be blown by the fans into intimate contact with the ore, and while the temperature of the latter is thus kept within safe limits, the roasting will be intensified, and sintering and the formation of zinc ferrites will be prevented. The materials in the silo 6 may be treated with a blast of hot air from below in order to produce a slight agglomeration.

The general result of the arrangement will be a better utilization of furnace, particularly if the latter is provided with a high muffle, and a corresponding increase in the output.

The arrangement is applicable to furnaces comprising a tier of roasting chambers and also to furnaces having annular or spiral roasting soles. The shape of the fans and their mounting may be modified within the scope of the invention.

I claim:

1. A method of roasting sulphur containing ores in mechanical furnaces with high roofed muffles, consisting in stirring the ore in the muffle, introducing into the muffle only enough air to carry out the roasting process, and agitating the air in the muffle independently of the mere introduction thereof so as to set up whirling air currents over the surface of the ore layer.

2. The combination with a muffle furnace for roasting zinc blende and the like, of a plurality of vertical rotatable shafts mounted in the roof of the muffle, and fans secured to said shafts inside the muffle and adapted to produce air currents directed towards the sole of the muffle.

3. The structure claimed in claim 2 in combination with sand wells mounted on the roof of the muffle and surrounding the shafts, a disc on each shaft, and a flange on said disc extending downwards into the respective well to provide a gas-tight seal.

4. A structure as claimed in claim 2 wherein the fan shafts are hollow and adapted to admit air into the muffle.

5. The combination with a muffle furnace for roasting zinc blende and the like, of a plurality of hollow, vertical shafts mounted in the roof of the muffle, fans secured to said shafts inside the muffle, means for rotating the shafts and fans so as to produce air currents directed towards the sole of the muffle, air supply pipes connected to the hollow shafts, and valves controlling the admission of air through the different shafts into the muffle.

GEORG BALZ.